US008038038B2

(12) United States Patent
Hillhouse et al.

(10) Patent No.: US 8,038,038 B2
(45) Date of Patent: Oct. 18, 2011

(54) SPRING ENGINE DRIVEN FLUID DISPENSING SYSTEM

(75) Inventors: Donald R. Hillhouse, Silver Springs, NY (US); James W. Campbell, Akron, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 1103 days.

(21) Appl. No.: 11/890,581

(22) Filed: Aug. 7, 2007

(65) Prior Publication Data

US 2008/0029620 A1 Feb. 7, 2008

Related U.S. Application Data

(60) Provisional application No. 60/836,082, filed on Aug. 7, 2006.

(51) Int. Cl.

| | |
|---|---|
| ***B67D 7/58*** | (2010.01) |
| ***B05B 11/00*** | (2006.01) |
| ***B05B 7/32*** | (2006.01) |
| ***F03G 1/00*** | (2006.01) |

(52) U.S. Cl. .................. 222/383.1; 222/383.3; 222/333; 239/337; 185/39

(58) Field of Classification Search .................. 222/333, 222/383.1, 383.2, 383.3; 239/333, 332, 337; 184/105.2; 185/37, 39
See application file for complete search history.

(56) References Cited

U.S. PATENT DOCUMENTS

| | | | | |
|---|---|---|---|---|
| 924,669 | A * | 6/1909 | Ross | 185/37 |
| 1,233,135 | A | 7/1917 | Smith | |
| 1,635,978 | A * | 7/1927 | Ross | 446/358 |
| 2,597,650 | A | 5/1952 | Maehren | |
| 3,279,653 | A * | 10/1966 | Pfleger | 222/642 |
| 3,732,949 | A | 5/1973 | Williams | |
| 3,853,109 | A | 12/1974 | Dooley | |
| 4,478,313 | A * | 10/1984 | Wakase | 185/39 |
| 4,676,122 | A * | 6/1987 | Szabo et al. | 74/625 |
| 5,716,007 | A * | 2/1998 | Nottingham et al. | 239/332 |
| 5,880,532 | A * | 3/1999 | Stopher | 290/1 E |
| 6,076,516 | A | 6/2000 | Tucker | |
| 6,199,664 | B1 * | 3/2001 | Tkaczyk et al. | 185/39 |
| 6,957,683 | B2 * | 10/2005 | Toti | 160/170 |
| 7,588,198 | B2 * | 9/2009 | Hornsby et al. | 239/308 |
| 2005/0133540 | A1 * | 6/2005 | Hornsby et al. | 222/333 |

* cited by examiner

*Primary Examiner* — Kevin P Shaver
*Assistant Examiner* — Stephanie E Williams
(74) *Attorney, Agent, or Firm* — Kenneth J. Lukacher; Martin Lukacher

(57) ABSTRACT

A fluid dispensing system provides a sprayer. The system has a container with liquid fluid, such as used in lawn and garden weed control and fertilization. The sprayer has a handle containing a spring engine and a pump for liquid from the container. The spring engine has a flat spring having a spring band extending from two coils wound on two shafts. One of the coils is manually wound by a crank connected to a shaft on which the coil is connected. The other shaft is connected to the pump by a rotary cam driver. Liquid is sucked by the pump into a pump chamber during part of a cycle of rotation of the other shaft when the coils are unwound and the liquid is pumped out of the chamber during the other part of the cycle of rotation to a sprayer head on the sprayer handle.

17 Claims, 12 Drawing Sheets

SPRING ENGINE DRIVEN FLUID DISPENSING SYSTEM

Priority is claimed to U.S. Provisional Application No. 60/836,082, filed Aug. 7, 2006, which is herein incorporated by reference.

DESCRIPTION

The present invention relates to a fluid dispensing system, and especially to a fluid dispensing system which provides a sprayer. The system provides a sprayer wherein a pump driven by a windable band spring engine pumps liquid to be sprayed out of a tank through a spray head. The pump and spring drive may be contained in a handle having the spray head integrated therein.

Sprayers are usually designed to pressurize liquid in a tank. The pressurized liquid is released via a spray head connected to the tank by a hose. The present invention utilizes a spring engine which drives a pump which is in continuous communication with a supply of fluid to be dispensed and can supply a substantially continuous fluid stream with the pump. The engine may be a coil, flat spring engine which may be wound manually. Then, the wound spring may be released to drive the pump to dispense the liquid via a spray head.

Further advantages and features of the invention will be more apparent from the following drawings in which.

Figure 1:
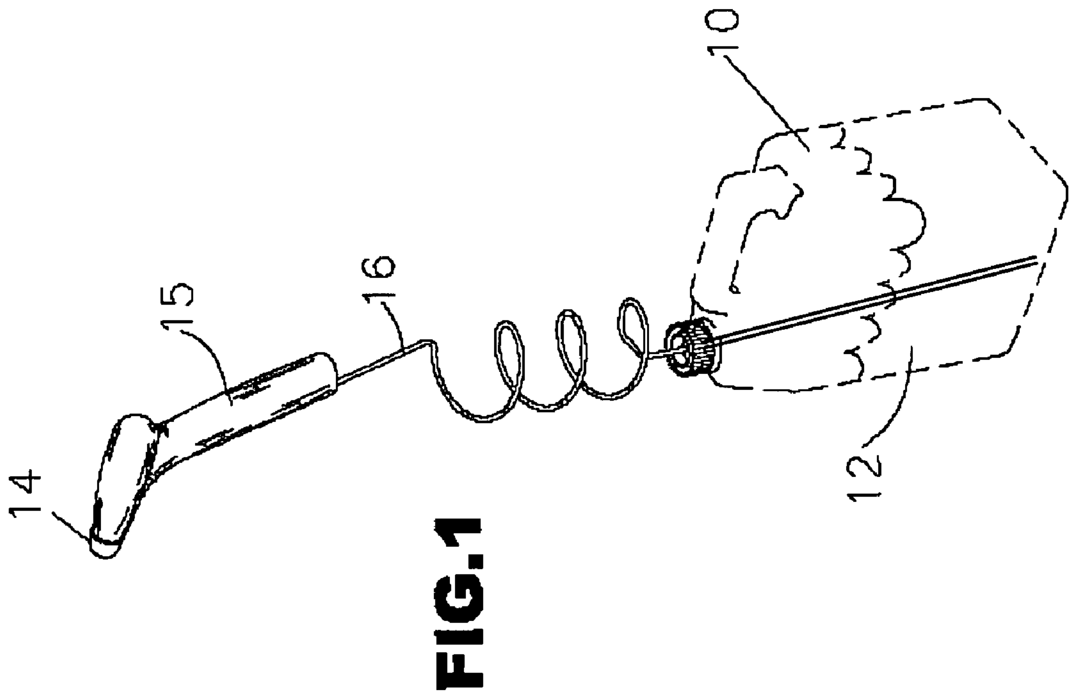
FIG. 1 is a schematic diagram of a spring engine driven fluid dispensing system, according to the invention, providing a sprayer, and including a tank from which liquid is drawn to the handle housing, where the handle contains a band spring engine, a pump and spray nozzle.
Figure 2:
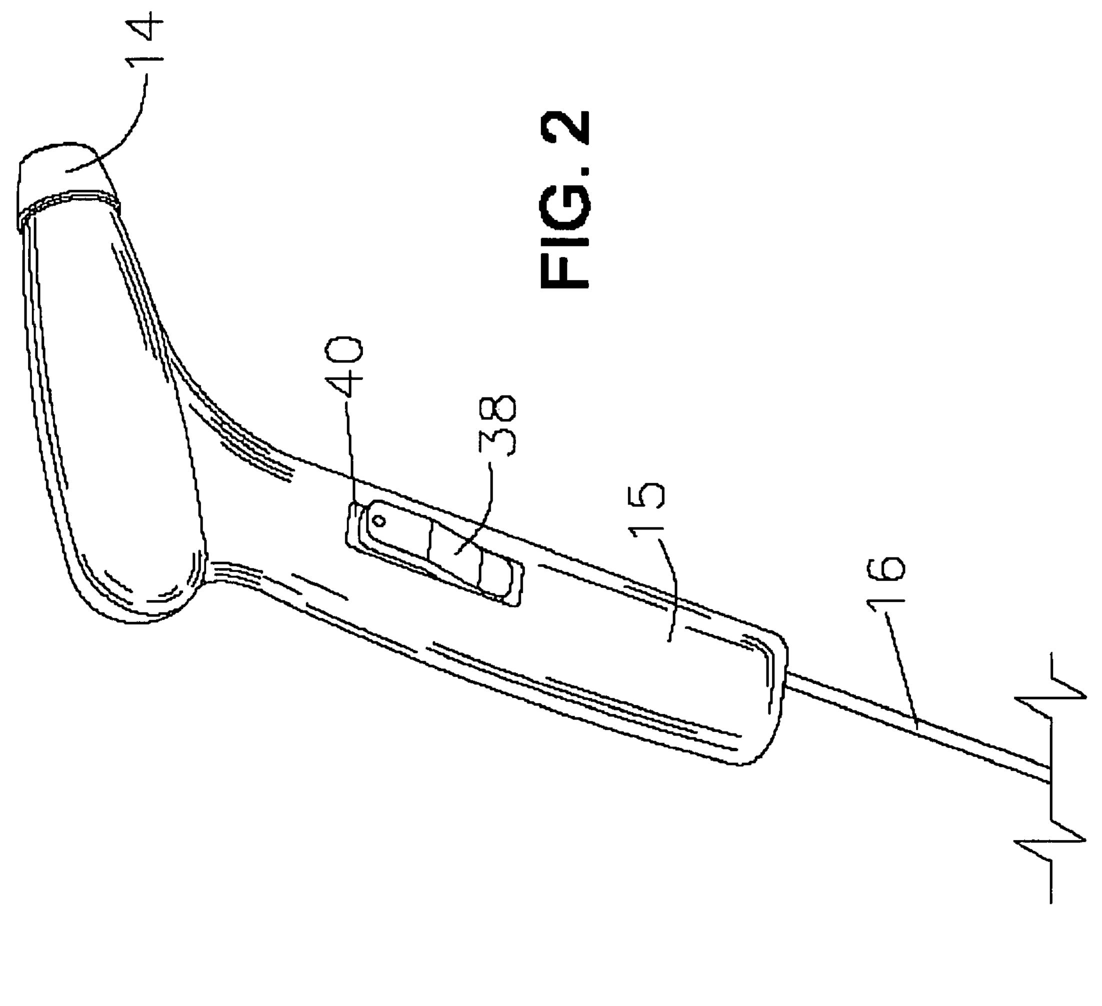
FIG. 2 is a side view of the handle of the sprayer showing a crank to wind the band spring engine.

Referring to FIGS. 1 and 2, there is shown a tank 10 having a liquid fluid 12 to be sprayed via a sprayer nozzle 14 at an end of the L-shaped handle 15. The liquid 12 is delivered to the handle 15 via a supply hose 16.

The container has a band spring engine 20 (see FIGS. 2-5 and 7), a cam motion translating mechanism 22, and a pump 23. The pump has a cylindrical body 28 and a piston 30. A one-way valve 32 controls flow of liquid as it is being pumped into a pump chamber 34 in the body 28.

The handle 15 has two clamshell sections which can snap together to form the handle 15 and capture internal components therein (i.e., the pump 23, spring engine 20, and cam mechanism 22).

Figure 3:
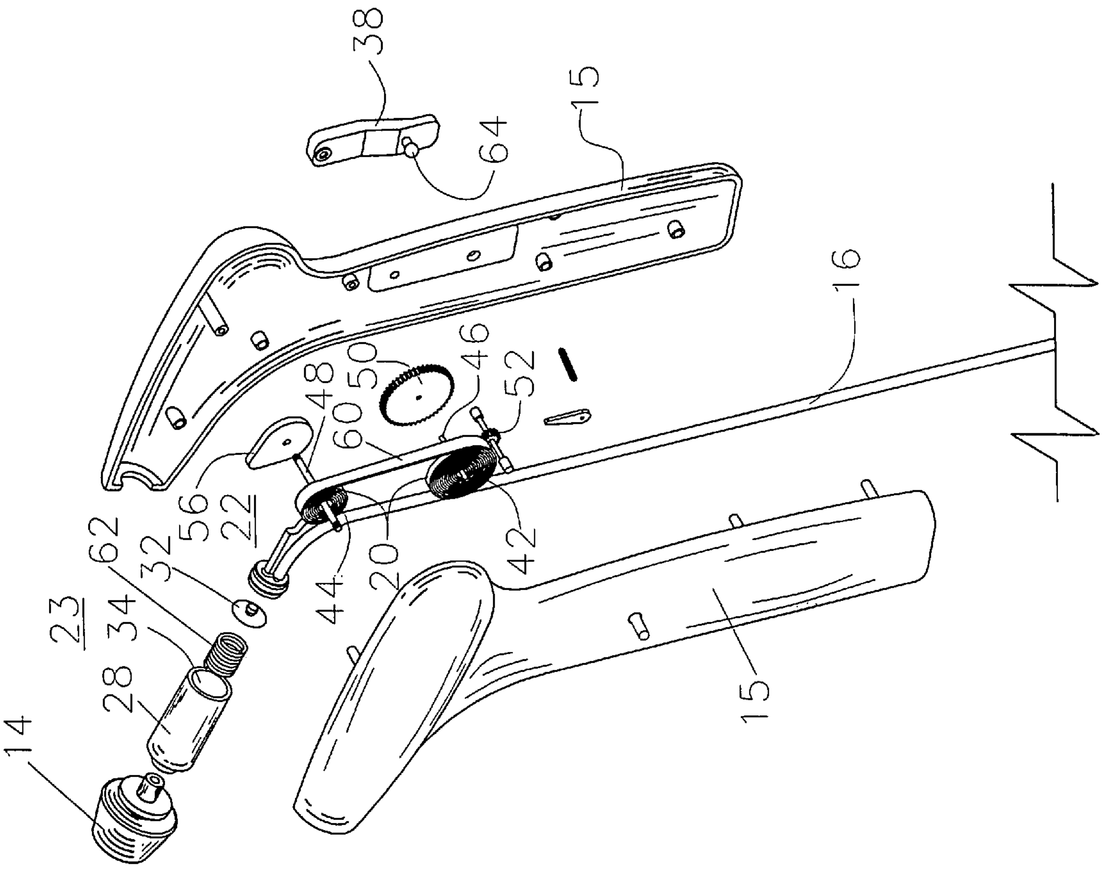
FIG. 3 is an exploded view of the handle shown in FIGS. 1 and 2.
Figure 4:
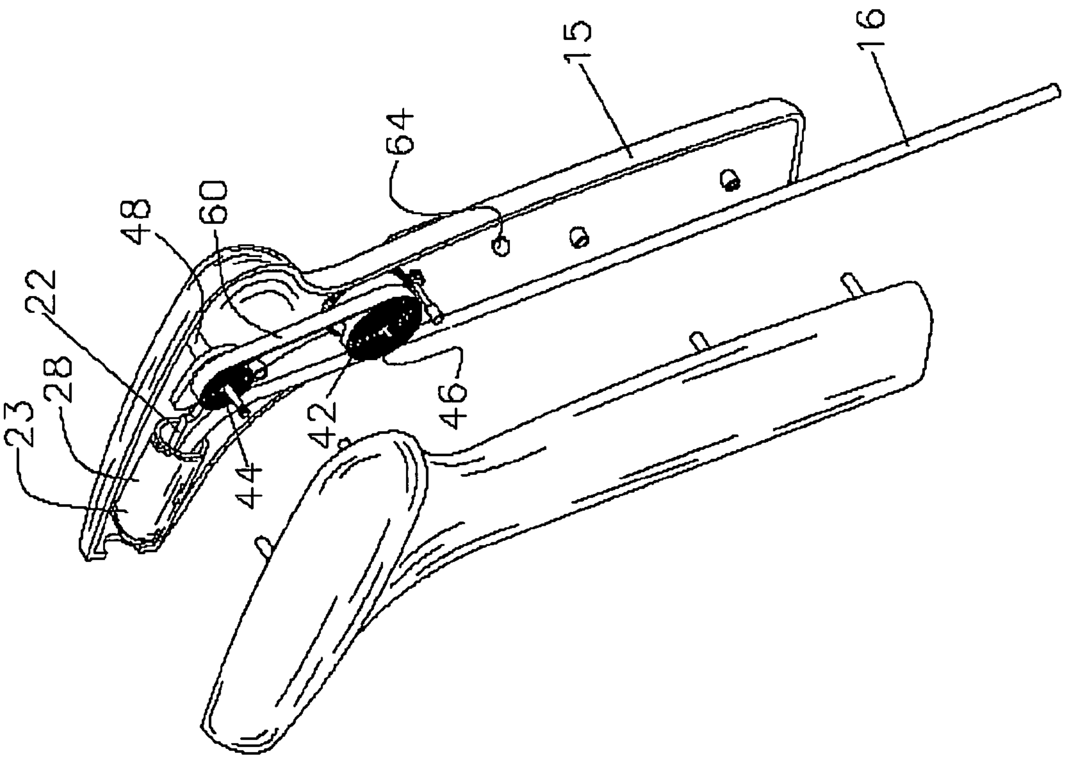
FIG. 4 is a schematic diagram of the internals of the sprayer handle showing the band spring engine, the pump and a cam coupling for reciprocating the pump piston in a pump chamber, when the band spring is released after being manually wound; such reciprocating pump draws liquid drawn into the pump chamber and then ejects the liquid in the chamber through the nozzle.
Figure 5:
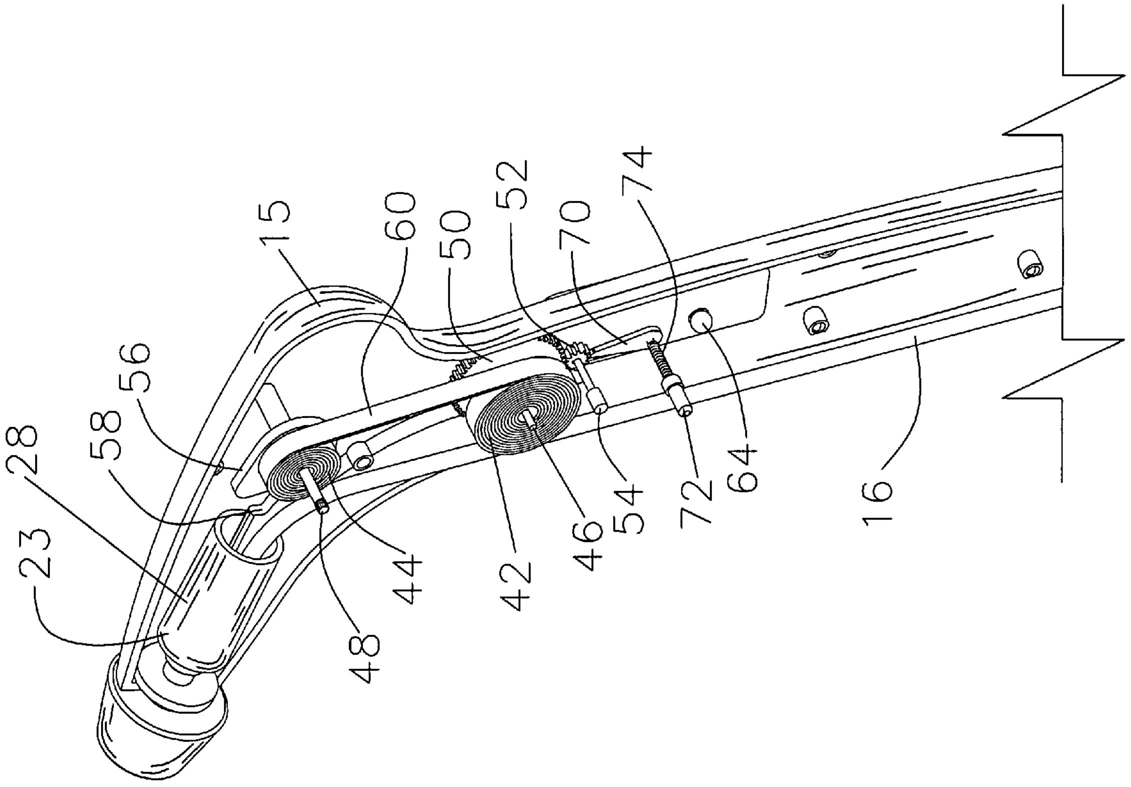
FIG. 5 is a view of one side of the sprayer handle showing in part, the band spring engine, the winding mechanism therefor, the pump, and the cam mechanism for transferring rotary motion from the spring as it is unwound to reciprocate the pump.

FIGS. 2 and 3 shows the crank handle 38 which is stowed in a recess 40 in the side of handle 15. Also in FIG. 3, the engine 20 is shown having a flat spring band 60 extending from two coils 42 and 44 disposed on drive shaft 46 and an output shaft 48, respectively. The drive shaft 46 has a gear 50 keyed or otherwise connected a pinion 52 on a shaft 54, which is driven by the crank 38 winding the band 60 onto coil 42. The shaft 48 is connected to cam 56 so as to drive the cam motion translating mechanism 22. Cam 56 engages a cam surface 58 (FIGS. 5-6) of the mechanism 22. Thus, rotation of the cam 56 translates rotary into reciprocal motion of the piston 30 of the pump 23 in chamber 34. The one-way check valve 32 is held closed on the forward pressure stroke of pump 23 by a coil spring 62 in chamber 34 of the pump 23 and the pressure in chamber 34.

In operation, the crank handle 38 is released by extracting a locking pin 64 from the recess 40 in handle 15. The locking pin 64 extends from the crank handle 38 into a hole or notch in recess 40, and can be released from its hole or notch by a user by slightly pulling the crank away from its recess 40, such that crank handle 38 is released for rotation. As shown in FIGS. 4-7, crank handle 38 winds band 60 into the coil 42 because the crank rotates the shaft 54 which rotates pinion 52.

A pawl 70 is held by a lever 72 and a spring 74 to prevent rotation of the coil 42 in an unwinding direction. After the crank handle 38 is stowed is recess 40, pawl 70 is released. The coil 42 unwinds, while coil 44 on shaft 48 winds. The shaft 48 rotates, thereby rotating the cam 56.

Figure 6:
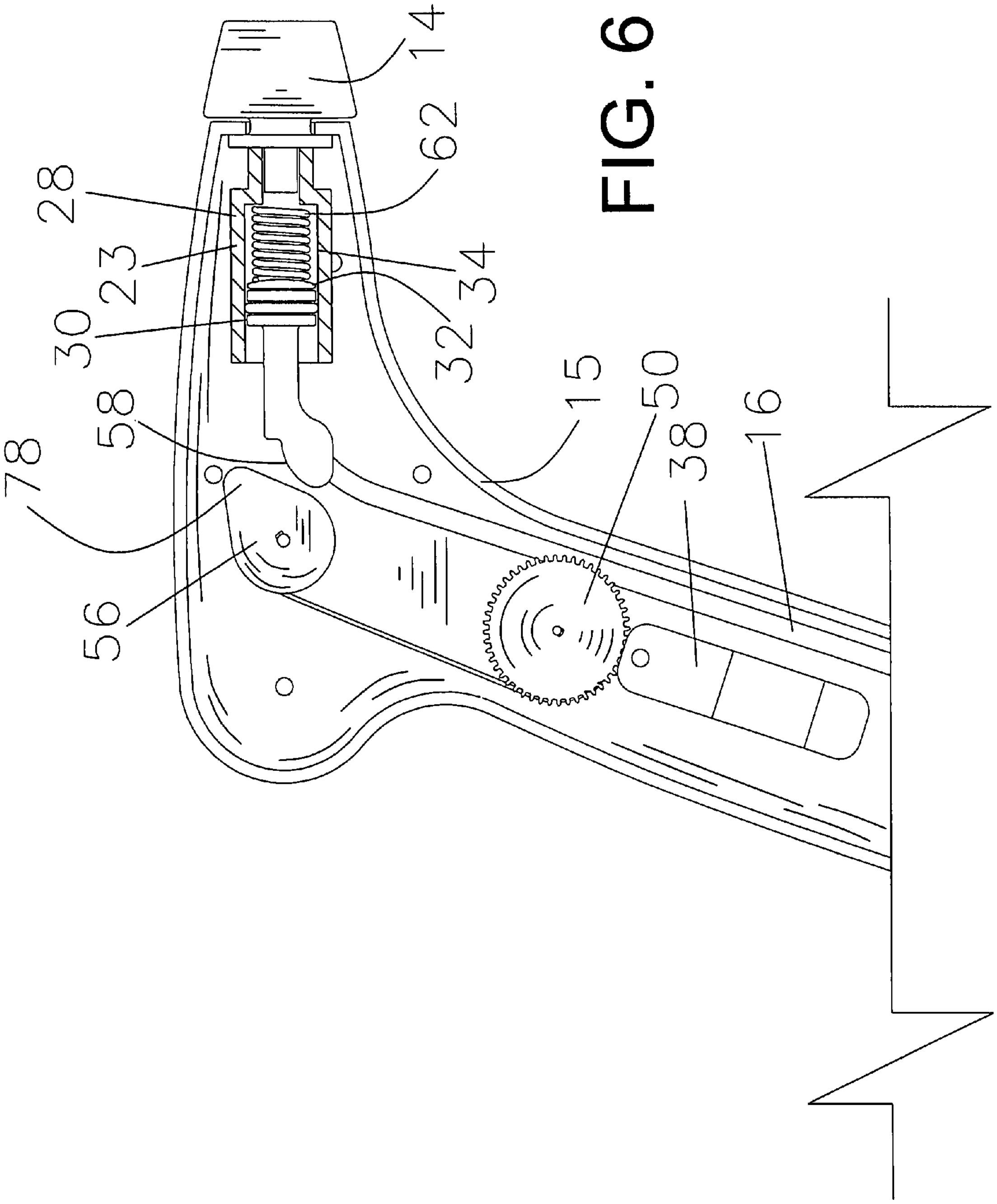
FIG. 6 is an enlarged view of the internals of the handle showing the pump, the band spring, and the cam rotation motion translating mechanism.
Figure 7:
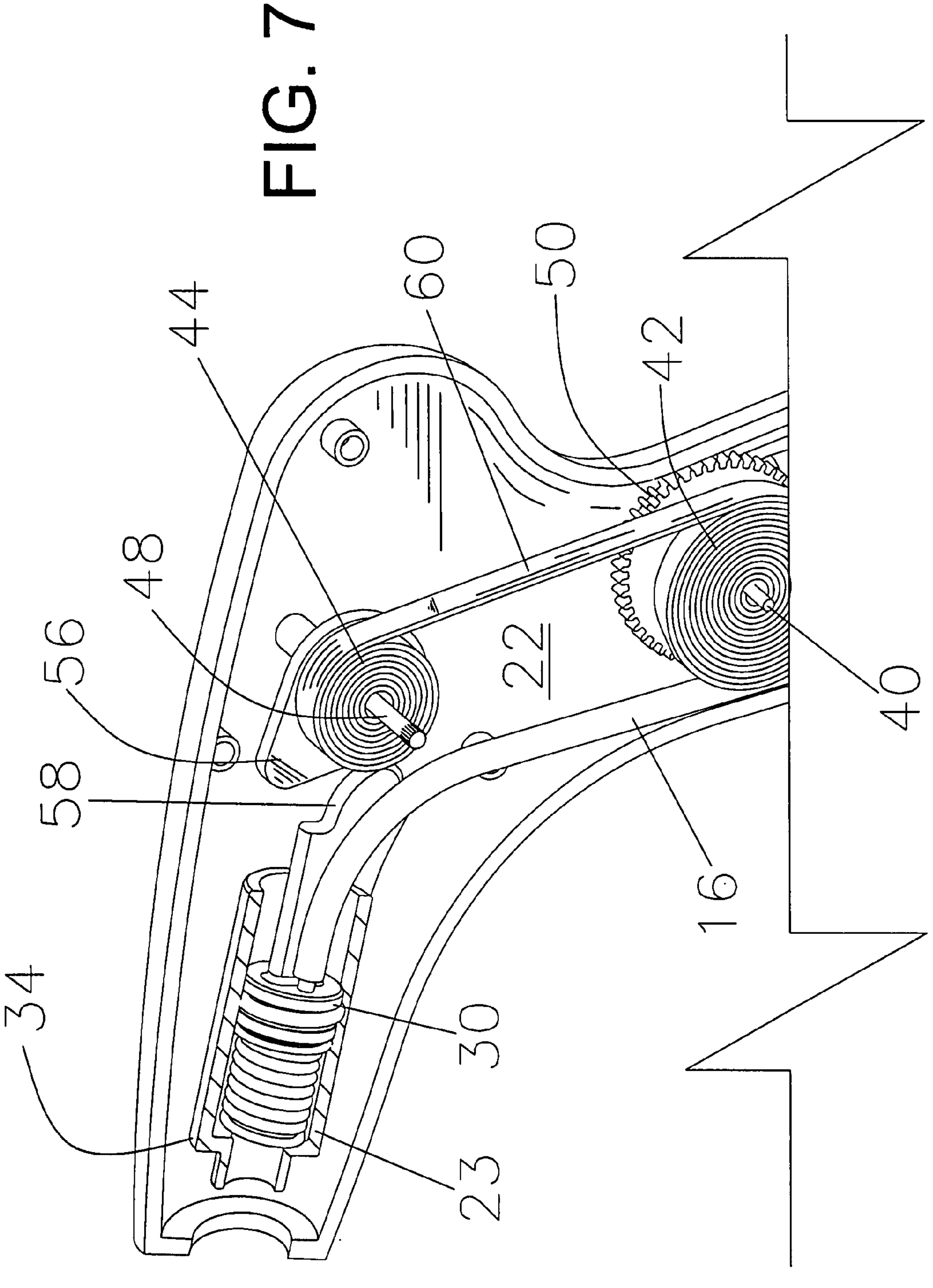
FIG. 7 is a view similar to FIG. 6 from the opposite side of the handle.

During part of the cycle of rotation of cam 56, the spring 62 drives the piston to the left, as shown in FIG. 6. Liquid is then drawn into the pump chamber 34 in the body 28. When the lobe 78 of the cam 56 engages the surface 58 during the remaining part of each cycle of rotation of the cam 56, the piston pressures the pump chamber 34 (the one-way valve 32 then closes the inlet from hose 16). Liquid 12 is then pumped out of the chamber 34 to provide a sprayer stream via the nozzle 14. The cam 56 can provide several cycles of rotation during each unwind of the springs 42 of the engine 20, thereby providing a substantially continuous stream of liquid 12 or a spray from nozzle 14. However, a rotary pump may be used instead of a piston pump driven by the spring engine 20 to provide a continuous, rather than an intermittent spray stream.

Figure 8:
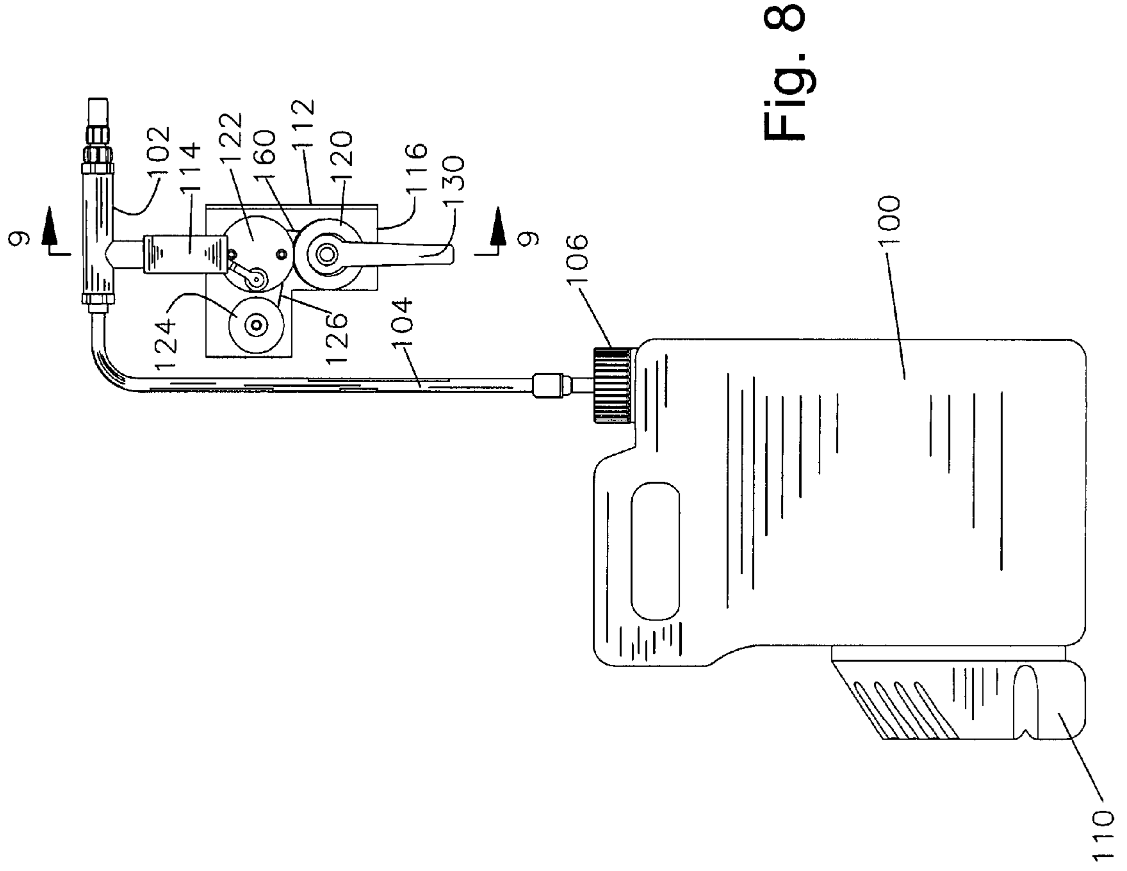
FIG. 8 is a diagram schematically showing a fluid dispensing system which provides a sprayer in accordance with another embodiment of the invention.
Figure 11:
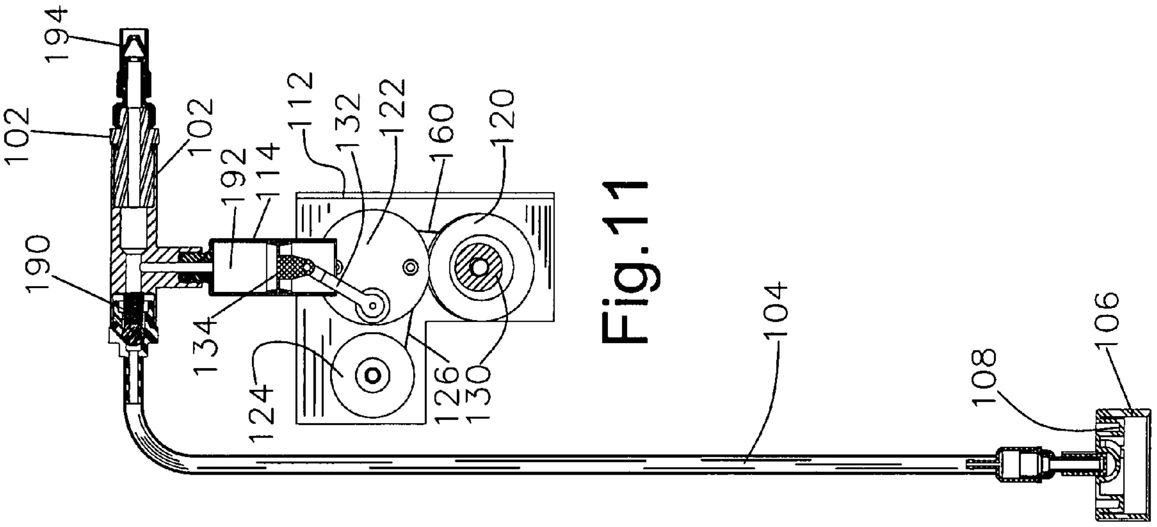
FIG. 11 is a view similar to FIG. 8 but with the crank removed and showing the connection of the hose from the sprayer head to a cap on the fluid container.

Another embodiment of the invention is illustrated in FIGS. 8-12. In FIG. 8, there is shown a container or tank 100 connected to a sprayer head 102 via a flexible hose 104. The hose is connected to the container by a cap 106 which is vented by holes 108 therein as shown in FIG. 11. The hose 104 may extend all the way to the bottom of the tank 100 for picking up liquid as the tank empties. To the side of the tank 100 is a holster 110 in which the sprayer head 102 and a crank operated spring engine 112, a pump 114 and the head 102 may be removably housed. The spring engine 112, pump 114 and head 102 may be housed in an enclosure or housing (not shown) so as to facilitate carriage or manipulation thereof.

Figure 9:
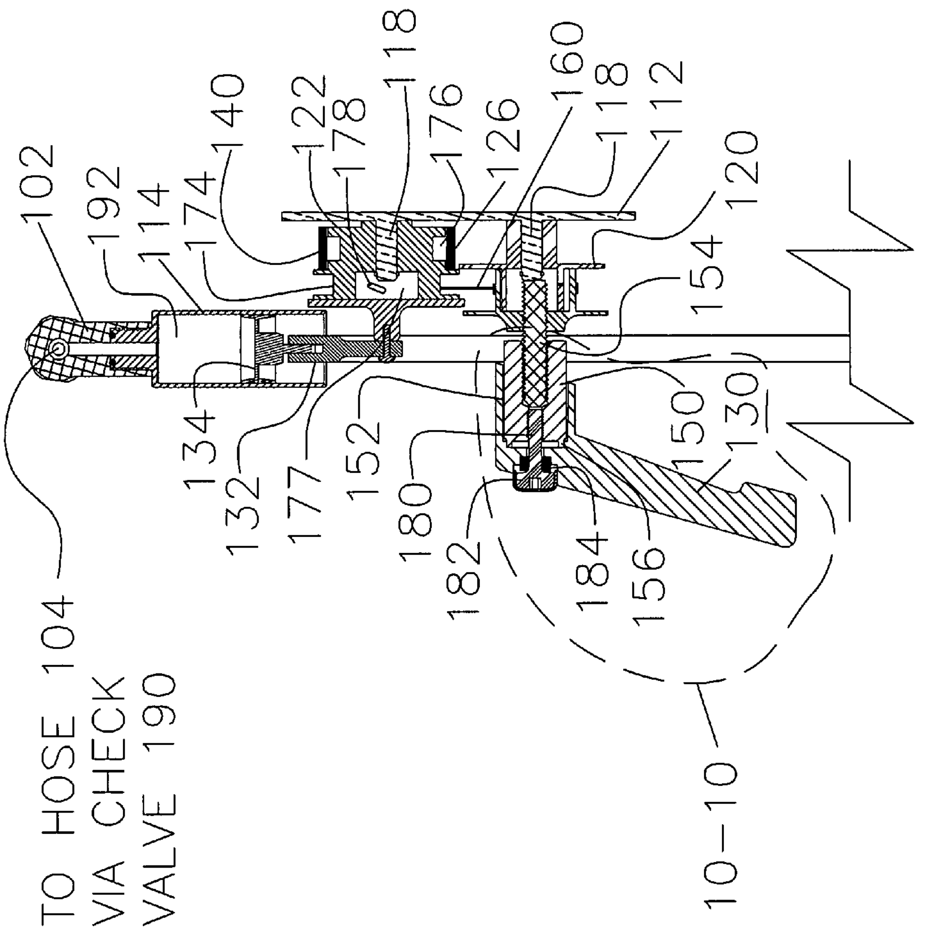
FIG. 9 is a fragmentary sectional view along the line 9-9 in FIG. 8, the view being taken in the direction of the arrows.
Figure 10:
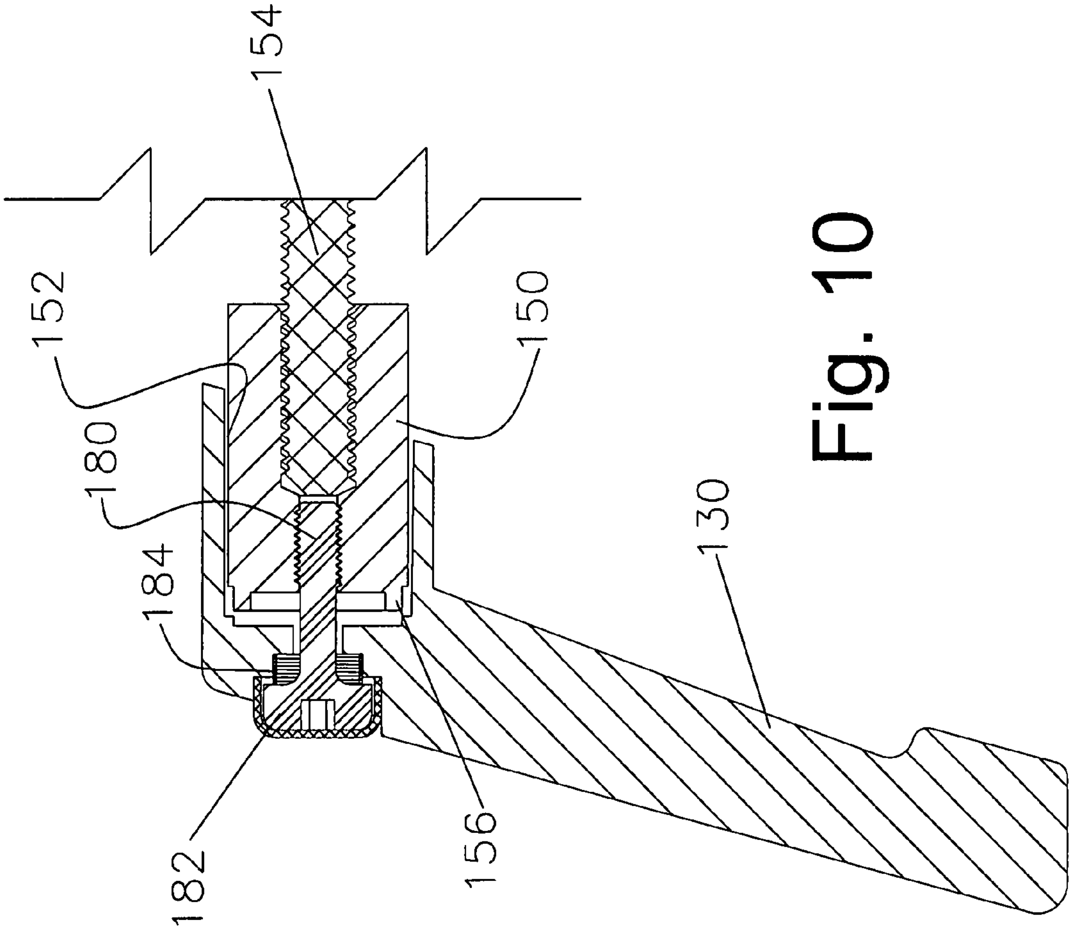
FIG. 10 is an enlarged view within the dashed loop 10-10 in FIG. 9.

The spring engine 112 is mounted on a base 116. Rotatably mounted on shafts 118 are three spools, namely a winding spool 120, and output spool 122, and a storage spool 124. A mechanism for winding a flat or band spring 126 on the storage spool 124 includes a manually rotatable crank 130. The output spool 122 is connected to the pump 114 by a transmission which is illustrated as an eccentric, arm 132 pivotally mounted to the output spool 122 and to a piston 134 of the pump 114. The eccentric 132 translates rotary motion of the output spool 122 under power of the band spring 126 as it is unwound from a coil on the output spool 122 to a coil on the storage spool 124. The coil 140 of the band spring 126 when wound up on the output spool 122 is shown in FIG. 9.

The winding mechanism is provided by the crank 130 and a cylindrical pawl 150 axially moveable in an opening 152 of the crank 130. The pawl 150 is connected by a screw thread on a shaft 154, which is also connected by the screw thread thereon to the winding spool 120. The pawl 150 is rotatably connected to the crank 130 by ratchet teeth 156 at the end of the pawl 150 which engages corresponding teeth at the inner end of the hole 152 in the crank 130.

A filament in the form of a wire 160 extends between the output spool 122 and the winding spool 120. The output spool has side-by-side receptacles 174 and 176. The wire 160 winds and unwinds between the output spool receptacle 174 and the winding spool 120. The band spring 126 winds and unwinds from the receptacle 176 in the output spool. In FIG. 9, the filament or wire 160 is shown completely unwound from the spool receptacle 174. The end of the wire 160 is captured inside the spool 122 by being extended through a slot 178 and tied in the receptacle 177 inside the spool 122 by a knot which prevents the wire from escaping from the slot 178.

To wind the spring 126, the crank 130 turns the winding spool 120 via the ratchet teeth 156 and the cylindrical pawl 150 which are connected by the threaded shaft 154.

In order to enable the wound spring band 126 to unwind from the output spool 122 and wind on the storage spool 124, the cylindrical pawl 150 is released by a pin 180 having a head 182. The pin 180 is attached by a screw thread thereon to the pawl 150. A coil spring 184 between the crank 130 and the head 182 of the pin biases the pawl 150 to the left as shown in FIG. 9 so as to connect the ratchet teeth 156. The crank 130 may therefore be rotated to wind the spring 126 on the output spool 122 and unwind it from the storage spool 124. By holding the head 182 with the thumb and pulling back on the crank or handle 130 with the fingers of the hand, the pawl 150 is released and can rotate with the winding spool 120. Since the winding spool 120 is released, the output spool 122 rotates under the power of the spring 126 as it is unwound from the tightened condition shown in FIG. 9. The wire 160 winds in the receptacle 174 of the spool 122 and the unwinding band spring 126 winds itself up on the storage spool 124. The rotation of the output spool 122 translates via the eccentric transmission mechanism 132 into reciprocating motion of the piston 134.

When the spring 126 wound on the output spool 122 is released, the piston 134 is driven by the power of the released spring 126 downwardly and creates a negative pressure which draws fluid from the container 100 via the hose 104 through a one-way or check valve 190 into the piston chamber 192 (see FIG. 11). The piston 134 is then driven forwardly into the chamber 192. Since the check valve 190 does not permit flow backwards into the hose 104, the fluid is forced in a spurt through the nozzle end 194 of the spray head 102. Several rotations of the output spool and reciprocations of the piston 134 in the pump occur for each unwinding cycle of the band spring 126. Thus, a sequence or continual flow is produced from the nozzle 194 of the sprayer.

The wind up wire 160 winds and unwinds between the winding spool 120 and the output spool 122, but may instead wind and unwind between the winding spool 120 and the storage spool 124. The construction illustrated in the drawings where the winding wire extends between the storage and winding spools 122 and 120 is presently preferred.

Figure 12:
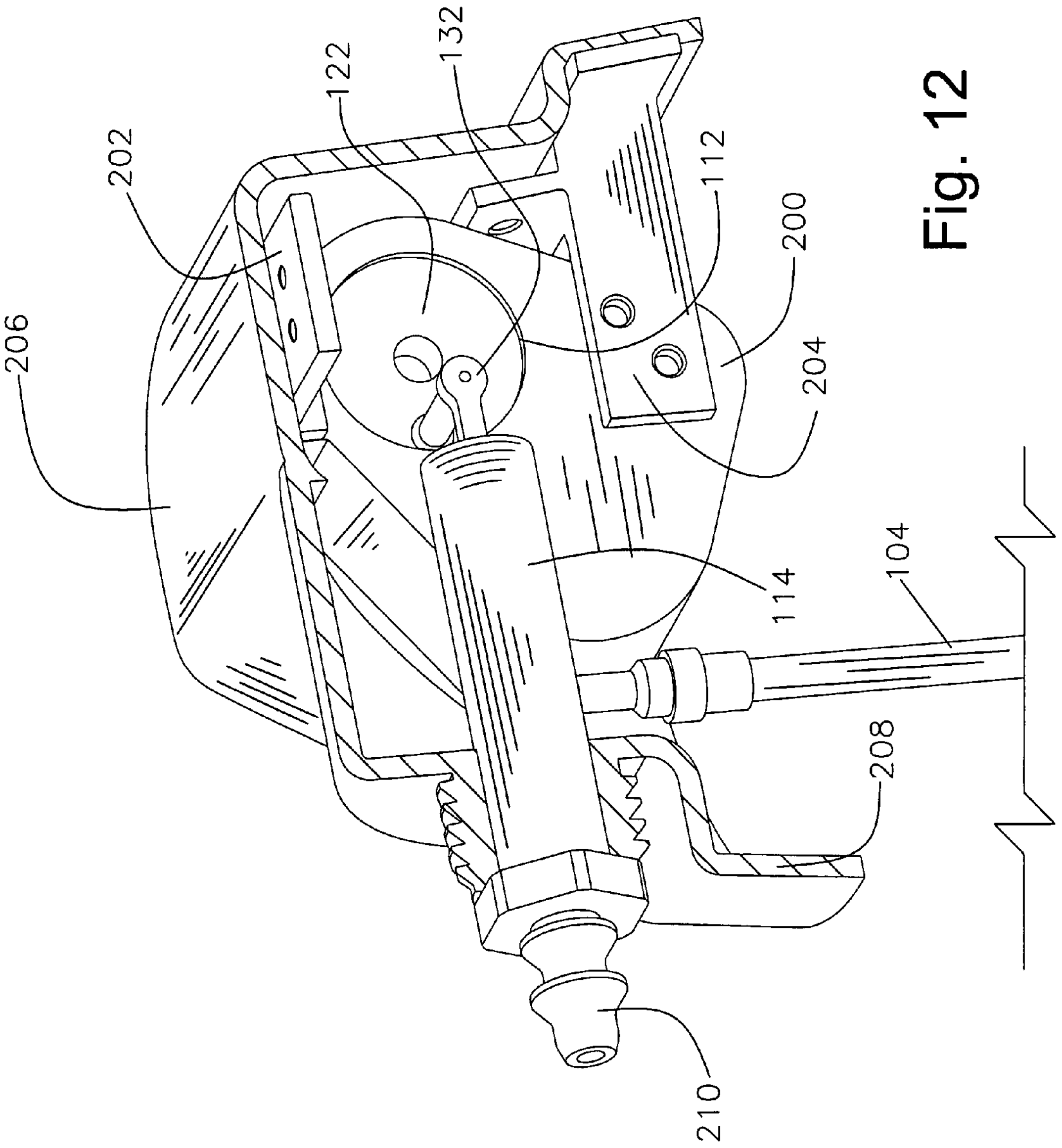
FIG. 12 is a view of the spring engine and pump in a cap suitable for installation on a sprayer tank containing the liquid to be sprayed.

Referring to FIG. 12, there is shown the spring engine 112 enclosed in a housing 200. This housing is attached by brackets 202 and 204 in a cap 206, which may be attached to a container or tank by a screw thread (not shown) on the bottom rim 208 thereof. The hose 104 is connected to the pressure chamber of the pump 114 via a check valve as shown in FIG. 9. The hose may be connected via the barbed coupling 210 at the end of the pump 114.

From the foregoing description, it will be apparent that an improved pump driven sprayer has been provided. Variations and modifications in the herein described apparatus within the scope of the invention will undoubtedly become apparent to those skilled in the art. According the foregoing description should be taken as illustrative and not in a limiting sense.

The invention claimed is:

1. A fluid dispensing system comprising a spring engine having a spring winding cycle and a spring unwinding cycle, a pump in communication with a source of fluid to be dispensed larger in capacity than said pump, and a transmission providing a plurality of actuations of said pump for each cycle of said engine thereby dispensing a substantially continual stream of fluid from said source, and further comprising means for manually winding a flat band into a first coil during said winding cycle, a spool receiving a second coil of said band when said first coil unwinds during said unwinding cycle, said transmission being coupled to said second coil.

2. The system according to claim 1 wherein said winding means comprises a crank coupled to said first coil during said winding cycle and being released from said first coil during said unwinding cycle.

3. The system of claim 1 wherein said pump is a reciprocable piston pump, said transmission coupling said piston of said pump to said spring during at least one of said cycles.

4. The system of claim 3 wherein transmission includes an eccentric rotary to reciprocation motion translation mechanism connected between a shaft rotated by a flat band spring coil as said spring coil is wound and unwound between a first and second coil.

5. A sprayer for spraying liquid from a tank which comprises:

a spring engine having a manually windable flat or band spring; and a pump for drawing liquid from said tank and ejecting a substantially continual stream of liquid to provide a spray, said pump being driven by said engine, and further comprising a handle having a spray head for producing said spray; and said pump and engine being disposed internally of said handle.

6. A sprayer for spraying liquid from a tank which comprises:

a spring engine having a manually windable flat or band spring; and a pump for drawing liquid from said tank and ejecting a substantially continual stream of liquid to provide a spray, said pump being driven by said engine, and wherein said spring engine comprises:

a band spring wound in two coils;

a crank for winding said spring into at least one of said coils; and a mechanism for translating motion when said coil unwinds into motion of said pump, wherein said coils of said spring are disposed on and windable and unwindable between a storage spool and an output spool, and a winding spool, a spring winding filamentary element windable on and between one of said storage and output spools to wind said spring coil on said one of said storage and output spools while winding said element on said winding spool.

7. The sprayer according to claim 6 further comprising a mechanism including said crank for rotating said winding spool and selectively releasing said winding spool for rotation by said spring when it unwinds from said one of said storage and output spools.

8. The sprayer according to claim 7, wherein said crank is rotatably connected to said winding spool via a ratchet mechanism so as to release said winding spool from said crank to enable said winding spool to rotate under power of said spring when said spring unwinds.

9. The sprayer according to claim 8 wherein said ratchet mechanism comprises a cylindrical rotatable pawl having a shaft connected to said winding spool, said pawl being axially movable in an opening in said crank and connected to said crank via ratchet teeth in said pawl and in said crank opening, a spring biased pin axially movable in said crank and connected to said pawl, and said pin being biased to connect said ratchet teeth on said pawl and said crank into engagement so that said winding spool is rotatable by said crank to wind said spring via said element between said one of said storage spool and said output spool, and to release said ratchet teeth on said pawl from said ratchet teeth on said crank to enable said spools to rotate under power of said band spring when it unwinds.

10. A spring engine comprising a base, a spring windable and unwindable from coils on a storage spool and an output spool; a winding spool, a spring winding filamentary element windable and unwindable between one of said storage and output spools and said winding spool to wind said spring on said one of said storage and output spools while winding said element on said winding spool.

11. A spring engine according to claim 10 further comprising a mechanism for rotating said winding spool and selectively releasing said winding spool for rotation by said spring when it is unwound from said one of said storage and output spools.

12. The spring engine according to claim 11 wherein said mechanism comprises a manually rotatable crank rotatably connected to said winding spool via a ratchet mechanism so as to release said winding spool from said crank to enable said spools to rotate under power of said spring when said spring unwinds.

13. The spring engine according to claim 12 wherein said ratchet mechanism comprises a cylindrical rotatable pawl having a shaft connected to said winding spool, said pawl being axially movable in an opening in said crank and connected to said crank via ratchet teeth in said pawl and in said crank opening, a spring biased pin axially movable in said crank and connected to said pawl, and said pin being biased to connect said ratchet teeth on said pawl and said crank into engagement so that said winding spool is rotatable by said crank to wind said spring via said element between said one of said storage spool and said output spool, and to release said ratchet teeth on said pawl from said ratchet teeth on said crank to enable said spools to rotate under power of said band spring when it unwinds.

14. The spring engine according to claim 10 further comprising a transmission connecting said output spool in driving relationship with a rotary power utilization mechanism.

15. The spring engine according to claim 14 wherein said utilization mechanism is a fluid pump.

16. The spring engine according to claim 15 wherein said pump receives fluid at one end thereof via a check valve, and ejects said fluid from the opposite end thereof in a continual sequence of squirts as said band spring unwinds.

17. The spring engine according to claim 10 wherein said spring is a band or flat spring and said element is a wire.

* * * * *